United States Patent
Reth (10) Patent No.: US 11,325,726 B2
(45) Date of Patent: May 10, 2022

(54) METHOD AND APPARATUS FOR SPACECRAFT GYROSCOPE SCALE FACTOR CALIBRATION

(71) Applicant: Alan D Reth, Grasonville, MD (US)

(72) Inventor: Alan D Reth, Grasonville, MD (US)

( * ) Notice: Subject to any disclaimer, the term of this patent is extended or adjusted under 35 U.S.C. 154(b) by 0 days.

(21) Appl. No.: 16/106,070

(22) Filed: Aug. 21, 2018

(65) Prior Publication Data

US 2018/0346154 A1    Dec. 6, 2018

Related U.S. Application Data (63) Continuation of application No. 13/762,649, filed on Feb. 8, 2013, now Pat. No. 10,071,824.

(60) Provisional application No. 61/596,223, filed on Feb. 8, 2012.

(51) Int. Cl.
*B64G 1/28* (2006.01)
*G01C 25/00* (2006.01)

(52) U.S. Cl.
CPC ........... *B64G 1/288* (2013.01); *G01C 25/005* (2013.01)

(58) Field of Classification Search
CPC ............................... G01C 25/00; B64G 1/288
See application file for complete search history.

(56) References Cited

U.S. PATENT DOCUMENTS

| | | |
|---|---|---|
| 4,012,018 A | 3/1977 | Lorell et al. |
| 5,076,694 A | 12/1991 | Aronowitz |
| 5,109,346 A | 4/1992 | Wertz |
| 5,367,898 A | 11/1994 | Matsuzaki |
| 5,562,266 A | 10/1996 | Achkar et al. |
| 6,298,288 B1 | 10/2001 | Li et al. |
| 6,615,117 B2 | 9/2003 | Li et al. |
| 6,640,609 B1 | 11/2003 | Nadkarni et al. |
| 6,691,033 B1 | 2/2004 | Li et al. |
| 7,185,858 B2 | 3/2007 | Wang et al. |
| 7,216,036 B2 | 5/2007 | Brady et al. |
| 7,526,398 B1 | 4/2009 | Choi et al. |
| 8,210,023 B2 | 7/2012 | Jeanroy |
| 8,280,666 B2 | 10/2012 | Sill et al. |
| 8,762,091 B1* | 6/2014 | Foxlin ..................... G01P 15/00 702/87 |
| 2003/0115930 A1* | 6/2003 | Kappi .................... G01C 19/56 73/1.37 |
| 2003/0171855 A1 | 9/2003 | Li et al. |
| 2004/0201851 A1* | 10/2004 | Killpatrick ........... G01C 19/664 356/474 |

(Continued)

OTHER PUBLICATIONS

Langston, Krack and Reupke, "A Multimission Three-Axis Stabilized Spacecraft Flight Dynamics Ground Support System".

(Continued)

*Primary Examiner* — Lisa E Peters
(74) *Attorney, Agent, or Firm* — 24IP Law Group USA, PLLC; Timothy Dewitt (57) ABSTRACT

A method and apparatus for estimating gyro scale factor during normal spacecraft operations, using small attitude motions that are compliant with mission pointing accuracy and stability requirements and a signal processing method that specifically detects the intentionally induced motions. This process increases operational availability by avoiding the need to take the spacecraft offline for large calibration maneuvers.

4 Claims, 4 Drawing Sheets

(56) References Cited

U.S. PATENT DOCUMENTS

| | | | | |
|---|---|---|---|---|
| 2007/0032951 A1* | 2/2007 | Tanenhaus | ............. | G01C 25/00 702/151 |
| 2007/0240486 A1* | 10/2007 | Moore | ................... | G01C 21/16 73/1.37 |
| 2008/0046138 A1 | 2/2008 | Fowell et al. | | |
| 2011/0167893 A1 | 7/2011 | Frey | | |
| 2011/0295449 A1* | 12/2011 | Kreider | ................. | B64G 1/286 701/4 |

OTHER PUBLICATIONS

G. Welter, J. Boia, M. Gakenheimer, F. Kimmer, D. Channell American iNand L. Hallock, "Variations on the Davenport Gyroscope Calibration Algorithm".

R. Harman and I. Bar-Itzhack, "Implicit Spacecraft Gyro Calibration".

K. Yong and R. Headley, "Real-Time Precision Attitude Determiniation System (RETPAD) for Highly Maneuverable Spacecrafts," American Institute of Aeronautics and Astronautics, Inc. (1978).

T. Goodson, D. Gray, Y. Hahn and F. Peralta, "Cassini Maneuver Experience: Launch and Early Cruise," American Institute of Aeronautics and Astronautics, Inc. (1998).

R. Pandiyan and A Solaiappan, "A One Step Batch Filter for Estimating Gyroscope Calibration Parameters Using Star Vectors," American Institute of Aeronautics and Astronautics, Inc. (2004).

P. Martella and M. Buonocore, "Design and Verification of the GNC for the European ExoMars EDL Demonstrator," ThalesAlenia Space Italy (2011).

M. Pittelkau, "Kalman Filtering for Spacecraft System Alignment Calibration," Journal of Guidance, Control and Dynamics, vol. 24, No. 6, Nov.-Dec. 2001.

I. Bar-Itzhack and R. Harman, "In-Space Calibration of a Skewed Gyro Quadruplet," Journal of Guidance, Control, and Dynamics, vol. 25, No. 5, Sep.-Oct. 2002.

M. Pittelkau, "Survey of Calibration Algorithms for Spacecraft Attitude Sensors and Gyros," (2007).

I. Bar-Itzhack and R. Harman, A Comparison Between Implicit and Explicit Spacecraft Gyro Calibration.

* cited by examiner

METHOD AND APPARATUS FOR SPACECRAFT GYROSCOPE SCALE FACTOR CALIBRATION

CROSS-REFERENCE TO RELATED APPLICATIONS

The present application is a continuation of U.S. patent application Ser. No. 13/762,649, filed on Feb. 8, 2013, and which claims the benefit of the filing date of U.S. Provisional Patent Application Ser. No. 61/596,223 filed by the present inventor on Feb. 8, 2012.

The aforementioned patent applications are hereby incorporated by reference in their entirety.

STATEMENT REGARDING FEDERALLY SPONSORED RESEARCH OR DEVELOPMENT

This invention was made with government support under Contract Numbers NNG10CR13C and NNG10CR16C awarded by NASA. The government has certain rights in the invention.

BACKGROUND OF THE INVENTION

Field Of The Invention

The present invention relates generally to spacecraft attitude determination and control systems and particularly to on-orbit calibration of gyroscope scale factors.

Brief Description Of The Related Art

Gyroscopes (hereinafter, "gyros") provide measurements of incremental attitude changes or angular rates of a spacecraft. These measurements may be used as part of the attitude determination and control system (hereinafter, "ACS"), and they may be used in conjunction with the active pointing of payload instruments.

Gyros do not measure attitude, but changes in attitude; therefore, an ACS typically also includes one or more sensors capable of measuring attitude, such as star trackers. Star trackers have good performance in low-frequency ranges, but used alone, they may not be suitable for high-bandwidth, precision applications, due to limited output rate and high-frequency noise. Gyros, on the other hand, generally have good high-frequency performance, but their measurements wander or drift over long periods of time. Consequently, gyros alone cannot maintain accurate absolute attitude knowledge and control.

A typical ACS exploits the strengths of both of these sensors, using gyros to propagate an attitude estimate and periodically correcting the estimate with star tracker information. These functions are typically performed by a Kalman Filter having a state vector of six elements, three attitude corrections and three gyro bias corrections. Gyro biases are quasistatic offsets in the angular rate measured by gyros. Since these biases drift over time, the ACS compensates the gyro rate data by subtracting the current bias estimates from the measured rates. The compensated gyro rates are used for propagating the attitude estimate and sometimes for providing control signals to instruments that have an active line of sight control capability.

Gyro errors contributing to vehicle and/or instrument pointing errors include bias, misalignments, and scale factor errors. For nadir-pointing missions and inertial-pointing missions, misalignment and scale factor errors may have negligible impact to steady-state performance or may be indistinguishable from bias errors. In those cases, a dynamic estimate of apparent gyro bias is often sufficient to achieve required performance.

Some missions require gyro scale factor to be accurately known in order to meet requirements. Characteristics of such missions can include a) performing spacecraft slews on gyros only, i.e., under conditions that preclude use of the star trackers during slews, b) stabilizing an instrument line of sight in the presence of dynamic attitude disturbances, or c) maintaining attitude knowledge in the presence of dynamic disturbances. An example is a spacecraft that includes a high-resolution imaging sensor that operates during attitude transients induced by thruster firings or other disturbance events and requires precise line of sight control or precise geolocation of the acquired image data.

Gyro scale factor is typically measured to within the required accuracy prior to spacecraft launch and again during on-orbit spacecraft commissioning. However, gyro scale factor drifts over time, which can result in non-compliant ACS performance. A method to calibrate gyro scale factor over the life of a mission is often required in order to meet requirements.

A prior art method for on-orbit calibration of gyro scale factor includes adding scale factor states to a standard six state onboard Kalman Filter. For mission profiles that include spacecraft slews that are large enough and frequent enough, that is a viable approach. For missions with attitude profiles that are mostly steady-state, e.g., being inertially fixed or rotating at one revolution per orbit, gyro scale factor errors may not be observable enough for a Kalman Filter to accurately estimate them.

Another prior art method overcomes this limitation by executing large-angle spacecraft slews for gyro calibration, making it possible to distinguish the effects of gyro scale factor from gyro bias. Under that approach, data acquired during large calibration slews are processed by an on-board Kalman Filter or on the ground by customary estimation techniques. This method requires periodically taking the spacecraft offline, temporarily suspending normal operations, such as imaging, while performing calibration maneuvers. Some missions cannot accept such a loss in operational availability. Thus, for certain missions, prior art gyro calibration techniques force a choice between system downtime or out-of-specification performance.

SUMMARY OF THE INVENTION

The invention disclosed herein is a novel method and apparatus for estimating gyro scale factor during normal spacecraft operations, using small attitude motions that are compliant with mission pointing accuracy and stability requirements and a signal processing method that specifically detects the intentionally induced motions. This innovation increases operational availability by avoiding the need to take the spacecraft offline for large calibration maneuvers. Simulation results have confirmed successful operation of this invention.

Small, intentionally induced attitude motions are referred to herein as dither. The present invention uses sinusoidal dither profiles of a frequency and amplitude that are designed according to whatever particular mission to which this invention is applied. The amplitude and frequency are predetermined such that attitude error, attitude rate, attitude stability, and reaction wheel torque allocations are simultaneously satisfied. Within those constraints, the amplitude should generally be made as large as possible, to improve estimation accuracy. While sinusoidal dither profiles are used to describe the preferred embodiment, other periodic signals of small amplitude that satisfy normal operational requirements may be used with the invention.

Figure 4A:
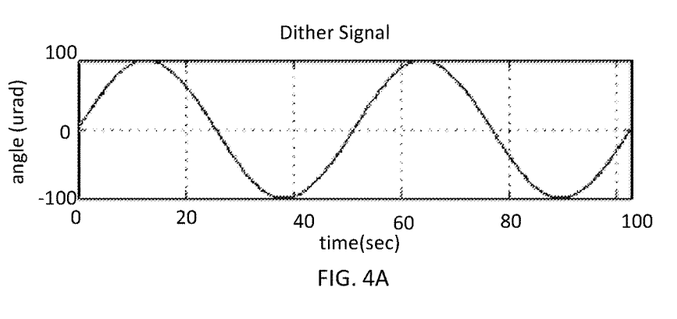
FIG. 4A is a graph of a sample dither signal in accordance with a preferred embodiment of the present invention examined in the developmental simulations.

As an example, the dither signal for the mission examined in the aforementioned simulations is shown in FIG. 4A. The relevant attitude control requirements and the portions thereof allocated to the dither motion are summarized in Table 1 below.

TABLE 1

Attitude Control Allocations for Dither

| Description | Dither Allocation | Requirement |
|---|---|---|
| Control, microradians, 0-pk | 100 | <360 |
| Stability, microradians, pk-pk over 60 sec | 200 | <500 |
| Rate, microradian/sec | 12.3 | <100 |
| Torque, Nm | <0.03 | <0.7 |

The present invention processes data acquired from gyros and one or more attitude sensors, such as star trackers. The attitude sensors provide measurements of the three-axis attitude of the spacecraft, and the gyros provide measurements of angular rate about the three orthogonal body axes of the spacecraft. Typically, spacecraft ACS use rate-integrating gyros, which may output incremental angle or whole angle rather than rate. For purposes of this invention disclosure, we assume without loss of generality that the outputs of the gyros are suitably preprocessed so as to generate angular rate measurements. Similarly, the star trackers are assumed to be of the "autonomous" class, meaning that they image stars and perform all processing necessary to periodically provide as output data a quaternion or other representation of three-axis attitude with respect to a standard inertially-fixed, Earth-centered reference frame, such as the J2000 or Geocentric Celestial Reference Frame (GCRF).

The invention processes the attitude and angular rate data to obtain single-axis attitude profiles as measured by the attitude sensors and single-axis attitude profiles as measured by the gyros. The invention generates single-axis attitude profiles from the particular attitude representation used by the ACS: quaternions, Euler angles, etc. The invention calculates the time integral of the gyro rates that are resolved, for example, along the three spacecraft body axes to obtain single-axis attitude profiles.

A novel element of the present invention is the detection of the dither signature from the attitude and angular rate measurements. The dither frequency is known exactly since it is predetermined, and the invention uses Fourier methods to recover the amplitude of the dither signal as measured by the gyros and the attitude sensors. Using Fourier techniques, the invention is able to accurately measure the small dither signals in the presence of significant sensor noise.

An estimate of gyro scale factor could be obtained by comparing the dither amplitude measured by the gyro to the predetermined amplitude of the commanded dither motion. The invention obtains a more robust estimate by comparing the amplitude of the dither motion measured by the gyros to the amplitude of the dither motion measured by the star trackers. The scale factor of the star trackers is assumed to be unity, following calibrations that are performed before and after launch. The ratio of the measured gyro dither amplitude to the measured star tracker dither amplitude is an estimate of the gyro scale factor. By estimating the scale factor ratiometrically as described, the accuracy of the gyro scale factor estimate does not depend on the ability of the ACS to accurately track the amplitude of the commanded dither signal. We shall refer to a single instance of such a gyro scale factor estimate as a point estimate.

The accuracy of a point estimate is limited by the noise characteristics of the gyros and star trackers. The final step carried out by the invention is to obtain a number, say N, of point estimates as described in the previous paragraphs and to calculate the mean of those point estimates to obtain the scale factor estimate. The N point estimates are obtained from non-overlapping time spans of data so that random errors will be nearly statistically independent. The estimation error for the mean of N point estimates is expected to be diminished with respect to the error of a single point estimate by approximately a factor of one divided by the square root of N. The calibration process is performed independently on each of the axes so as to minimize cross-axis coupling effects.

In a preferred embodiment, the present invention is a method for calibrating a scale factor of an angular rate sensor. The method comprises the steps of imparting an excitation to the angular rate sensor, collecting angular rate measurements from the angular rate sensor during the imparted excitation, computing an amplitude of an integral of the collected angular rate measurements at the fundamental frequency of the imparted excitation, computing an expected value of the amplitude computed in the prior step independently of the angular rate measurements; and computing an angular rate sensor scale factor estimate as a ratio of the computed amplitude to the computed expected value.

The imparted excitation may comprise a periodic motion having a predetermined fundamental frequency and a predetermined amplitude. For example, the imparted excitation of periodic motion may sinusoidal, having an amplitude equal to the predetermined amplitude, frequency equal to the predetermined fundamental frequency, and arbitrary phase angle.

The method may be executed a plurality of times, and an improved scale factor estimate may be computed by calculating the mean of the angular rate sensor scale factor estimates so obtained. The repetitions of the method are performed over time spans that do not overlap each other. The angular rate sensor may measure angular rate about a single axis or measure angular rate about each of a plurality of axes and in the case of a plurality of axes may be performed on one axis at a time. The expected value is the predetermined amplitude of the imparted excitation.

The step of computing the amplitude of the integral of the angular rate measurements at the fundamental frequency of the imparted excitation may comprise the steps of computing the integral of the angular rate measurements and then computing the amplitude of the integrated angular rate measurements at the fundamental frequency of the imparted excitation. In another embodiment the step of computing the amplitude of the integral of the angular rate measurements at the fundamental frequency of the imparted excitation comprises the steps of computing the amplitude of the angular rate measurements at the imparted excitation frequency; and dividing said amplitude by the imparted excitation frequency expressed in units of radians per second. In still another embodiment, the step of computing the amplitude of the angular rate measurements at the imparted excitation frequency comprises the steps of transforming the angular rate sensor measurements from a time domain representation to a frequency domain representation and determining the amplitude of the frequency domain representation at the imparted excitation frequency. The step of transforming the angular rate sensor measurements from a time domain representation to a frequency domain representation comprises performing a fast Fourier transform of the angular rate sensor measurements. A reciprocal of the excitation frequency may be equal to the angular rate sensor measurement sample period times two raised to an integer power.

The angular rate sensor may be part of a navigation system. The navigation system may be mounted to a vehicle, and the step of imparting excitation may comprise imparting the motion to the vehicle. The imparted excitation may be added to an operational motion of the vehicle. Further, the imparted excitation may be selected such that a net motion of the vehicle with excitation is in accordance with operational requirements of the vehicle when the operational motion of the vehicle without excitation is in accordance with operational requirements of the vehicle. The navigation system may comprise an attitude sensor; and the step of computing an expected value comprises collecting attitude measurements from the attitude sensor during the imparted excitation and computing an amplitude of the attitude measurements at the fundamental frequency of the imparted excitation.

The step of computing the expected value comprises the steps of transforming the attitude sensor measurements from a time domain representation to a frequency domain representation; and determining the amplitude of the frequency domain representation at the imparted excitation frequency.

The step of transforming the attitude sensor measurements from a time domain representation to a frequency domain representation comprises performing a fast Fourier transform of the attitude sensor measurements.

In another embodiment, the present invention is a method for calibrating a scale factor of a spacecraft gyroscopic angular rate sensor. The method comprises the steps of predetermining a frequency and amplitude of sinusoidal spacecraft attitude motion that is within required attitude accuracy, attitude stability and attitude control system actuator control authority margins such that a period of the sinusoid is equal to a data sample period of the spacecraft gyroscopic sensor times two raised to an integer power, imparting sinusoidal motions of the predetermined amplitude and frequency to the attitude of the spacecraft, one axis at a time, computing an angular rate that is compensated for bias drift and misalignment using data from a gyroscopic angular rate sensor output, integrating said compensated angular rate to obtain a time profile of relative gyroscopic sensor attitude motion about the axis of imparted motion, processing said time profile of relative gyroscopic sensor attitude motion about the axis of imparted motion using a Fast Fourier Transform to obtain a gyroscopic sensor Fourier coefficient corresponding to the sinusoid frequency, computing a time profile of relative star tracker attitude motion about the axis of imparted motion over the same time span as the integrated compensated angular rate using data from a star tracker of the spacecraft, processing said time profile of relative star tracker attitude motion about the axis of imparted dither motion using a Fast Fourier Transform to obtain a star tracker Fourier coefficient corresponding to the sinusoid frequency, calculating a single-point estimate of a gyroscopic sensor scale factor by calculating a ratio of the computed gyroscopic sensor Fourier coefficient to the computed star tracker Fourier coefficient, repeating the above steps for the selected axis and calculating an arithmetic mean of the single-point estimates of the gyroscopic sensor scale factor, and repeating all of the steps for a second axis.

In yet another embodiment, the present invention is an apparatus for calibrating a scale factor. The apparatus or system comprises an angular rate sensor, means for imparting an excitation to the angular rate sensor, wherein said excitation comprises a periodic motion having a predetermined fundamental frequency and a predetermined amplitude, means for collecting angular rate measurements from the angular rate sensor during the imparted excitation, means for computing an amplitude of an integral of the collected angular rate measurements at the fundamental frequency of the imparted excitation, means for computing an expected value of the amplitude computed by the means for computing an amplitude independently of the angular rate measurements, and means for computing an angular rate sensor scale factor estimate as a ratio of the amplitude to the expected value.

In still another embodiment, the present invention is an apparatus or system for controlling an attitude of a vehicle. The apparatus or system comprises a gyroscope, a star tracker, an attitude command generator that generates a multi-axis attitude command signal, a dither signal generator that generates a dither signal, a summer having inputs connected to the attitude command generator and the dither signal generator for receiving the multi-axis attitude control signal and the dither signal and outputting a modified attitude command signal, an attitude determination and control module comprising a processor that receives data from the gyroscope and the star tracker and receives the modified altitude command signal from the summer and the processor uses the gyroscope and star tracker data to calculate an estimate of true vehicle attitude, and the attitude determination and control module generates torque commands to cause a true attitude of the vehicle to track a modified command attitude.

Still other aspects, features, and advantages of the present invention are readily apparent from the following detailed description, which illustrates preferred embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The present invention provides a method and apparatus for estimating gyro scale factor during normal spacecraft operations. While the invention is described in the context of spacecraft, the invention could be applied to any vehicle or system whose motion is of interest. The invention uses small attitude motions that are compliant with the pointing accuracy and stability requirements of the mission and a signal processing method that specifically detects the intentionally induced motions. This invention increases operational availability by avoiding the need to take the spacecraft offline for large calibration maneuvers.

Figure 1:
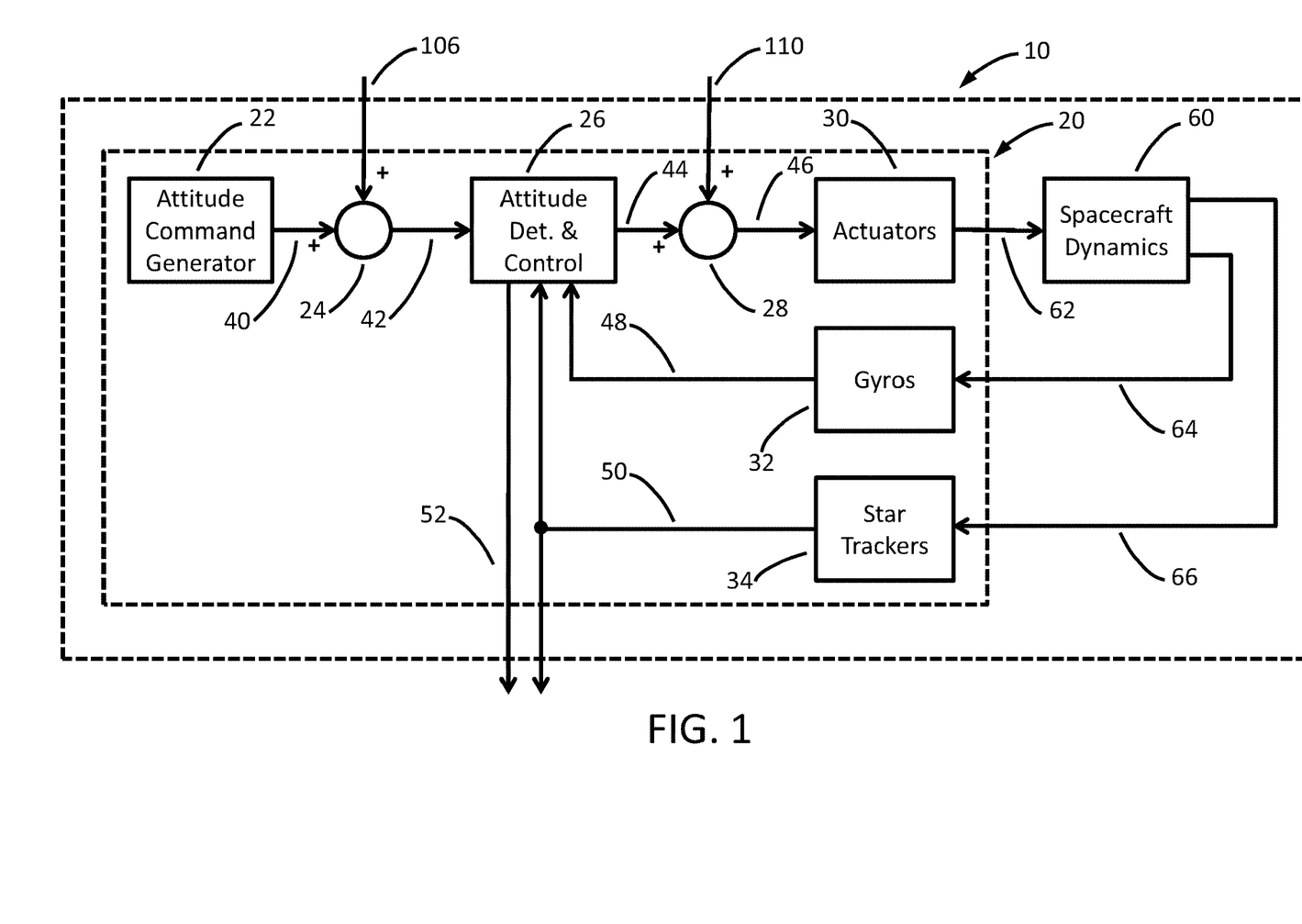
FIG. 1 is a block diagram of an exemplary spacecraft attitude control system (ACS) including spacecraft attitude dynamics.

An exemplary spacecraft attitude control system (ACS) and its interactions with the attitude dynamics of the spacecraft are shown in FIG. 1. The combined system of ACS 20 and spacecraft dynamics 60 is denoted as 10. The attitude command generator 22 provides a series of three-axis attitude commands 40 with respect to an inertial reference frame such as the Earth-centered inertial reference frame known as J2000. The commanded attitude profile is generated on-board in accordance with the requirements of the particular mission.

The invention introduces the dither angle profile 106 at summing junction 24, and the resulting modified attitude command profile 42 is input to the attitude determination and control module 26. In the attitude determination and control module 26 attitude determination and control algorithms are implemented as flight software that is executed on a processor within the module. The attitude determination and control algorithms use gyro data 48 and star tracker data 50 to estimate the true spacecraft attitude 66 and angular rate 64. The spacecraft attitude and angular rate estimates are internal to the attitude determination and control module 26 in FIG. 1 and are not explicitly shown there. The algorithms performed in module 26 also estimate gyro biases, which the algorithms subtract from the gyro rates to yield compensated gyro rates 52. The attitude determination and control module 26 generates torque commands 44 such that the true attitude 66 closely tracks the modified commanded attitude 42.

Dither feed-forward torque signal 110 may be applied to improve dither tracking performance of the ACS loop without requiring high closed-loop bandwidth. The feed-forward torque signal 110 is summed with the attitude control torque 44 at summing junction 28 to form the torque command 46 to the ACS actuators 30. The ACS actuators 30 may be, for example, a set of reaction wheels capable of imparting a three-axis control torque 62 to the spacecraft.

The spacecraft attitude dynamics 60 govern the mechanical response of the spacecraft to control torque 62. The attitude kinematics of the spacecraft include three-axis attitude 66 and three-axis angular rate 64, which are measured by star trackers 34 and gyros 32, respectively. The gyro data 48 and star tracker attitudes 50 are fed back to the attitude determination and control module 26.

The gyro data 48 may be angular rate, incremental angle, or integrated angle, depending on the type of gyro used. In any case, the attitude determination and control module 26 converts the gyro data 48 to angular rate about each of the three orthogonal spacecraft body axes for use by other parts of the attitude determination and control algorithms. The conversion of raw gyro data 48 to angular rate about the three body axes includes correction for misalignment, which may use a fixed misalignment correction matrix or a dynamically estimated correction. The star trackers are assumed without loss of generality to output three-axis inertial attitude data 50 using an attitude representation such as quaternions that indicate the attitude of the spacecraft with respect to a standard inertially-fixed, Earth-centered reference frame, such as the J2000 or Geocentric Celestial Reference Frame (GCRF). The star tracker data 50 and compensated gyro rates about the three orthogonal spacecraft body axes 52 are used to calibrate gyro scale factors.

Figure 4B:
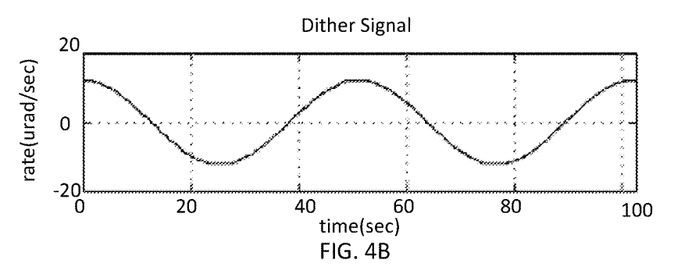
FIG. 4B is a graph of the angular rate profiles corresponding to the dither signal of FIG. 4A.
Figure 4C:
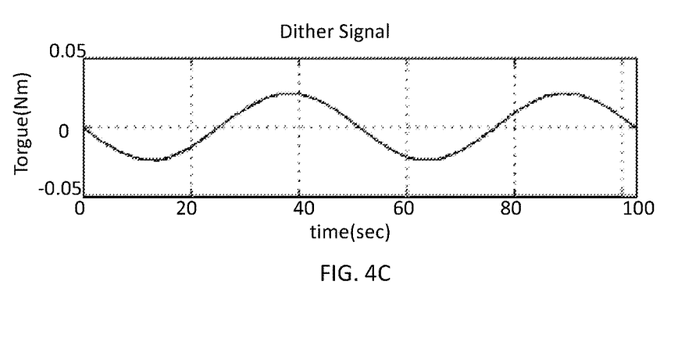
FIG. 4C is a graph of the torque profiles corresponding to the dither signal of FIG. 4A, assuming an inertia value of 16000 kg-m² for illustrative purposes.

The present invention commands a sinusoidal dither profile 106, which is superimposed onto the nominal attitude profile of the spacecraft. The sinusoidal dither is fully characterized by its amplitude and frequency. The phase angle of the dither is inconsequential for the present invention; therefore, without loss of generality it is implicitly equal to zero in the remaining descriptions. The dither amplitude and frequency are predetermined so that attitude error, attitude rate, attitude stability, and ACS actuator torque margin requirements are satisfied. A dither profile so prescribed will by definition not violate these requirements, thereby avoiding the need to suspend normal operations during calibration. The preferred embodiment of the present invention uses an amplitude of 100 microradians and a period of 51.2 seconds, where dither period is the reciprocal of dither frequency. These values were selected based on the mission parameters described earlier, and other values may be used. The dither angle 106, angular rate, and on-axis torque profiles for a representative spacecraft are shown in FIGS. 4A, 4B and 4C.

If necessary to achieve sufficient signal to noise ratio, dither parameters may be selected at levels that result in violations of one or more of the aforementioned requirements. In such cases, the present invention remains advantageous over prior art because it can perform gyro calibration with smaller motions and therefore less disruption to the mission, due to its ability to discriminate the dither in the presence of nominal spacecraft motion, disturbances, and noise.

Figure 2:
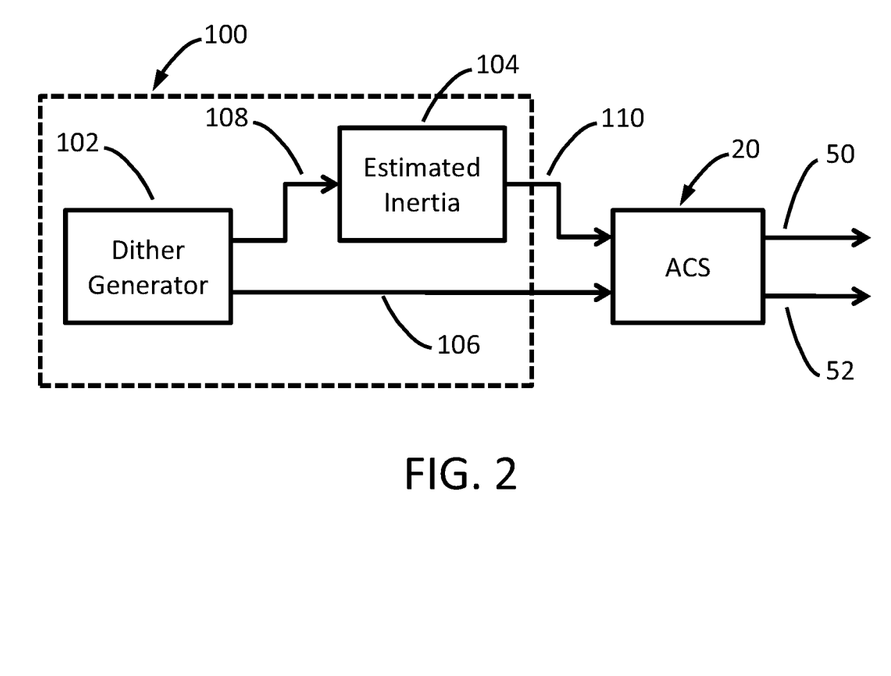
FIG. 2 is a block diagram illustrating a method for introducing a dither signal into a spacecraft ACS in accordance with a preferred embodiment of the present invention.

FIG. 2 shows a dither generation module 100 and its interconnection with the ACS 20. The dither angle signal 106 is generated by dither generator 102 as:

$$d(t)=A^*\sin(\omega^*t),$$

where d(t) is the dither angle 106 in radians, t is time in seconds, A is a vector of amplitudes in radians, and ω is the frequency in radians per second. The vector A is sets the amplitude of the dither signal and steers it to the desired axis in the spacecraft frame. The dither feed-forward torque 110 is calculated by multiplying the dither angular acceleration 108 by an estimate of the spacecraft inertia tensor 104. Dither angular acceleration 108 is calculated as:

$$a(t)=-A^*\omega^{2*}\sin(\omega^*t),$$

where a(t) is the dither angular acceleration 108 in radians per second squared, and t, A, and ω are as defined above. Note that if the estimated spacecraft inertia tensor 104 includes products of inertia, then the dither feed-forward torque 110 preemptively corrects for cross-axis motion due to inertial coupling, to the extent that the estimated inertia 104 represents the true inertia tensor of the spacecraft. When the dither generator 102 is active, the dither angle 106 and dither feed-forward torque 110 signals are computed as described in this paragraph. When the dither generator is inactive, the dither angle 106 and dither feed-forward torque 110 signals are set to zero.

FIG. 1 and FIG. 2 show the outputs of the dither generation module 100 used as inputs into the ACS 20. The dither generator signals 106, 110 are applied to the ACS 20 in such a way as to induce the dither motion in a single axis at a time. Methods for commanding motion about a single axis are well known to those practiced in the art of spacecraft attitude control systems and depend on the particular attitude representation used in the nominal three-axis attitude commands 40 and modified attitude command profile 42. For example, if the nominal and modified attitude commands are represented as quaternions, then the dither angle command 106 must also be represented as a quaternion. Similarly, in this example the summing junction 24 must perform quaternion multiplication. After the gyro scale factors are calibrated for the first axis, the process is repeated for the remaining axes, one at a time.

Figure 3:
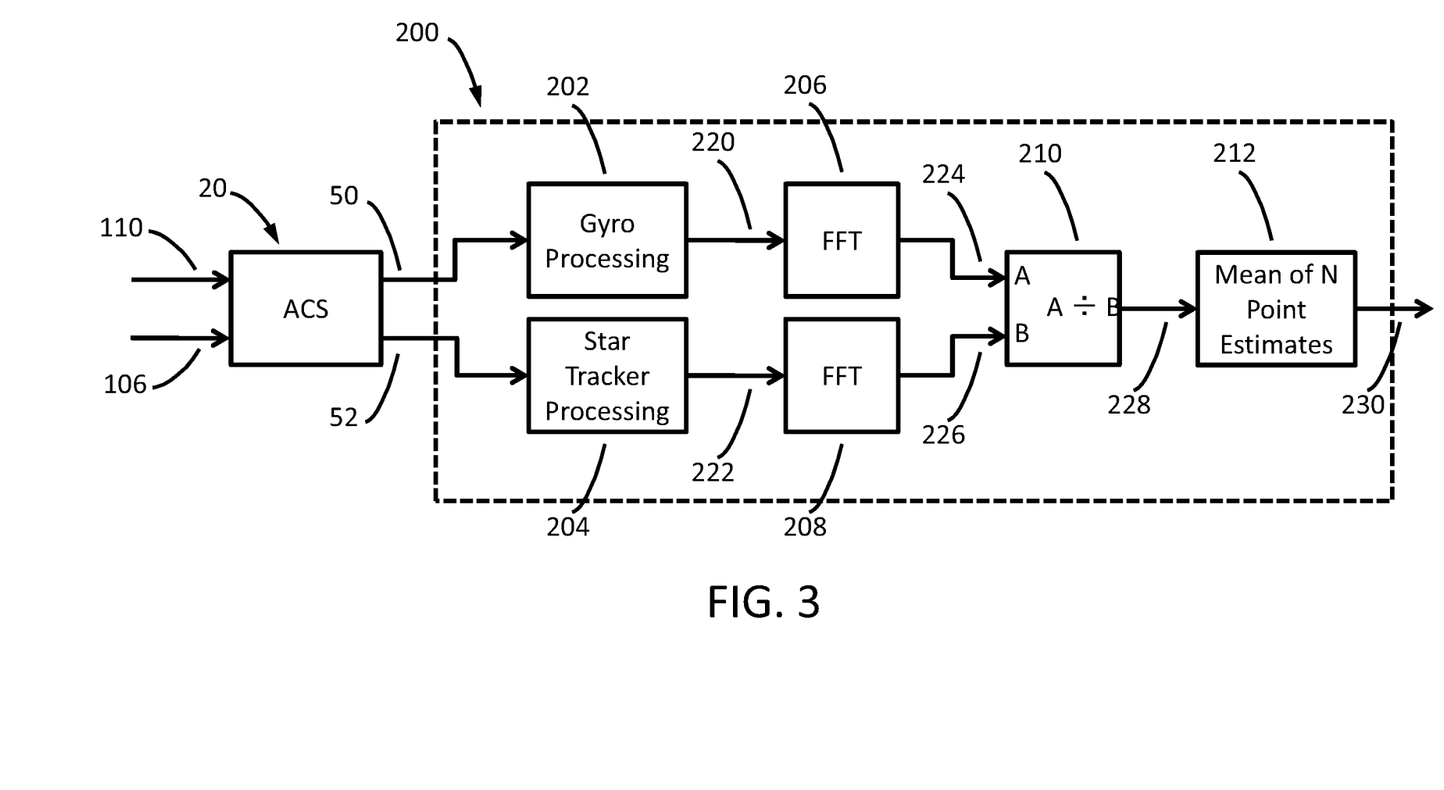
FIG. 3 is a block diagram illustrating a method for estimating gyro scale factor using the gyro and star tracker output signals in accordance with a preferred embodiment of the present invention.

FIG. 3 shows the gyro scale factor calibration method and apparatus 200 of the present invention in block diagram form. Inputs include star tracker attitude data 50 and compensated gyro rate data 52. The output of the method and apparatus 200 is the estimated gyro scale factor 230 for the current spacecraft axis being calibrated. The axis being calibrated is excited by the sinusoidal dither signal 106, and ACS 20 tracking is aided by the dither torque feed-forward signal 110.

In FIG. 3, the gyro processing block 202 integrates the compensated gyro rates 52 over the time span required for a single point estimate of the gyro scale factor. For the preferred embodiment of the present invention, the time span used to obtain a point estimate of gyro scale factor is sixteen times the dither period. Other times spans, of course, may be used. The initial condition for the integration of the compensated gyro rate 52 is reset to zero for each time span processed. The resulting angle profile 220 is processed by Fourier methods.

The star tracker processing 204 shown in FIG. 3 extracts the angular motion profile about the axis being calibrated. The single-axis profile consists of small-angle deviations about the mean attitude over the calibration period. The resulting star tracker angle profile 222 has a mean value of zero and is subsequently processed by Fourier methods.

The next step of the present invention determines the Fourier coefficients of gyro angle profile 220 and star tracker angle profile 222 corresponding to the dither frequency. Since a sinusoidal signal of a known frequency is injected into the system, the signature of that signal can be precisely detected within noisy sensor data by Fourier methods. The preferred embodiment of the present invention uses Fast Fourier Transforms (FFT 206 and 208) to determine the amplitudes of the sinusoidal component at the dither frequency for gyro angle profile 220 and star tracker angle profile 222. Other Fourier methods employed at this stage of the process would work equally well and are used in alternate embodiments of the invention. There are methods well-known to those practiced in the art for direct computation of the Fourier coefficient for a specific frequency, which in the case of the present invention is the dither frequency.

For the preferred embodiment using FFTs 206 and 208, performance is optimized by selecting a dither period that yields a number of data points per period that is a power of two, and setting the time span such that the number of points processed by the FFTs 206 and 208 is also a power of two. For example, the sample rate may be 10 Hz, yielding 512 ($2^9$) points per dither period and 8192 ($2^{13}$) points (16 dither periods) in each data span processed by the FFTs 206 and 208. The first constraint, having a power of two number of points per dither period, ensures that the dither frequency will be exactly aligned to one of the coefficients output by the FFT. Otherwise, one would need to interpolate between FFT output points in order to estimate the amplitude at the dither frequency, thereby losing accuracy. The second constraint, having a power of two number of points per data span, enables the FFT to function with optimal efficiency. The latter constraint is less important than the former, since it only affects processing efficiency and not calibration accuracy.

The method of the present invention then calculates the ratio 228 of the dither-frequency Fourier coefficients for the gyro 224 and star tracker 226 via an arithmetic divide operation 210 to obtain the amplitude of the dither content measured by the gyro relative to the amplitude of the dither content measured by the star trackers. Scale factor errors are not a concern for star trackers as their calibrations are typically accurate and stable. The present invention takes the scale factor of the star trackers to be unity. The star tracker measurement of dither motion represents the true motion of the spacecraft, to within the temporal and spatial error characteristics of the star trackers. The ratio 228 of the gyro to star tracker Fourier coefficients at the dither frequency is a point estimate of the gyro scale factor. By taking the ratio 228 of the gyro to star tracker Fourier coefficients, the present invention is insensitive to the tracking accuracy of the ACS 20 with respect to the dither signal 106.

The present invention calculates a number, N, of point estimates 228 of gyro scale factor and the mean of those estimates is computed by an N-point mean block 212 the result being the gyro scale factor estimate 230 for the axis under calibration. The N point estimates 228 are obtained from non-overlapping time spans of data so that random errors will be nearly statistically independent. The estimation error for the scale factor estimate 230 is expected to be diminished with respect to the error of a single point estimate 228 by approximately a factor of one divided by the square root of N. For the preferred embodiment of the present invention, the number N of point estimates is four, and the expected reduction factor in the error of the scale factor estimate 230 relative to the error of a single point estimate 228 is therefore 0.5, or one-half. Other numbers N of point estimates may be used in N-point mean block 212.

The dither generation module 100 and scale factor calibration module 200 calibrate each of the axes independently in succession to minimize cross-axis coupling effects.

The preferred embodiment of the present invention as disclosed herein is a specific example of the invention and is not to be construed as restricting the scope of the invention. For example, the invention would also be applicable to non-spacecraft applications that require accurate gyro calibration, such as air, land, and sea vehicles, civilian or military. Similarly, alternate reference sensors other than star trackers may be used. While the present invention is designed to use the various features and elements in the combination and relations described, some of these may be altered and others omitted without interfering with the more general results outlined, and the invention extends to such use. Modifications may be made to the methods and apparatus described without departing from the spirit and scope of the invention. Accordingly, the invention is not to be limited except as by the appended claims.

What is claimed is:

1. An apparatus for controlling an attitude of a vehicle, comprising:
    a gyroscope, wherein said gyroscope senses angular rate about an input axis;
    an attitude sensor, wherein said attitude sensor measures the attitude of said vehicle relative to an inertially-fixed reference frame;
    an attitude command generator, wherein said attitude command generator generates a multi-axis attitude command signal;
    a dither signal generator, wherein said dither signal generator generates a dither signal having a periodic angular displacement of a predetermined angular amplitude and a predetermined fundamental frequency, said dither signal further having a periodic rate of change of angular displacement having the same predetermined fundamental frequency as said periodic angular displacement and having a sign that alternates positive and negative, said dither signal representing periodic angular motion about an axis in said inertially-fixed reference frame;
    a summer having inputs connected to said attitude command generator and said dither signal generator, wherein said summer receives said multi-axis attitude control signal and said dither signal and outputs a modified attitude command signal that is equal to a vector sum of said inputs;
    an attitude determination and control module comprising a processor, wherein
        said attitude determination and control module receives data from said gyroscope and said attitude sensor and receives said modified altitude command signal from said summer,
        said processor uses said gyroscope and attitude sensor data to calculate an estimate of true vehicle attitude, and
        said attitude determination and control module generates torque commands to cause a true attitude of said vehicle to track said modified attitude command signal;
    an attitude actuator, wherein
        said attitude actuator imparts a torque to said vehicle in accordance with said torque commands generated by said attitude determination and control module.

2. A method for calibrating a scale factor of a gyroscope using the apparatus of claim 1, comprising the steps of:
    imparting a mechanical excitation using said attitude and determination control module to a vehicle having a gyroscope, said mechanical excitation having a periodic angular displacement of a predetermined angular amplitude and a predetermined fundamental frequency, said mechanical excitation further having a periodic rate of change of angular displacement, the periodic rate of change having the same predetermined fundamental frequency as said mechanical excitation and having a sign that alternates positive and negative, said mechanical excitation being imparted about an axis in said inertially-fixed reference frame;
    detecting a component of an output of the gyroscope, said detected component having the same predetermined fundamental frequency as said mechanical excitation;
    computing a measured angular amplitude from said detected component of the output of the gyroscope;
    collecting attitude measurements from said attitude sensor during a time interval over which the mechanical excitation occurs;
    detecting a component of the collected attitude measurements, said component having the same predetermined fundamental frequency as said mechanical excitation; and
    computing an angular amplitude of said component of the collected attitude measurements.

3. The apparatus according to claim 2, wherein said calibration is performed while said vehicle is also performing a function other than said calibration.

4. The apparatus according to claim 3, wherein said vehicle, while said calibration is performed, continues to comply with functional and performance specifications of said other function.

* * * * *